United States Patent Office 3,619,984
Patented Nov. 16, 1971

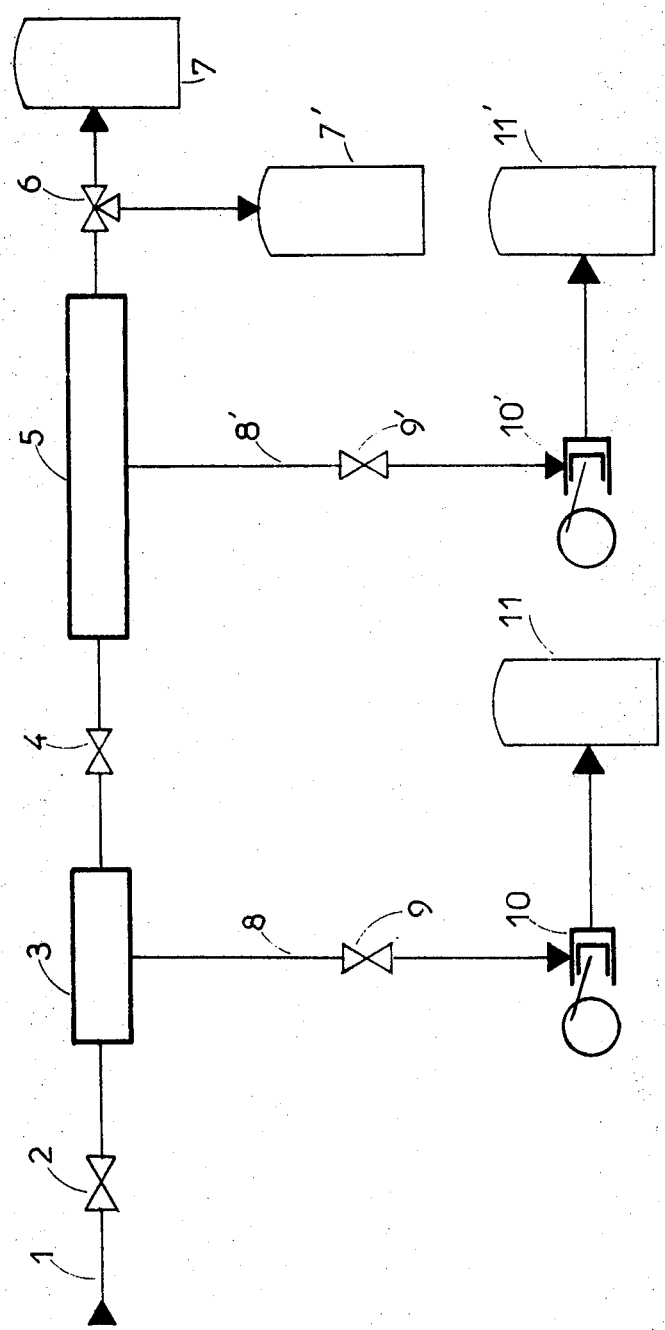

3,619,984
GAS SEPARATION BY ADSORPTION
Daniel Domine, Meudon, and Leon Hay, Paris, France, assignors to L'Air Liquide, Societe Anonyme pour l'Etude et l'Exploitation des Procedes Georges Claude, Paris, France
Filed Sept. 19, 1969, Ser. No. 859,446
Claims priority, application France, Sept. 27, 1968, 168,900
Int. Cl. B01d 53/04
U.S. Cl. 55—25
10 Claims

ABSTRACT OF THE DISCLOSURE

A process for separating a complex gaseous mixture formed of at least three constituents and for obtaining at least three of these constituents, in which a given quantity of mixture under pressure, at a given temperature, is admitted into several successive adsorption zones which have been evacuated, the admission of the mixture is stopped and one or optionally several gaseous fractions are withdrawn from the last of the said zones at one or more intermediate pressure levels, in which the said zones, the number of which is less by at least one integral value than the number of constituents to be separated, and which contain different adsorption masses capable of selectively adsorbing at least one of the constituents of the gaseous mixture, are then isolated from one another, whereupon the selectively adsorbed residual fractions are extracted in each of these zones at temperatures close to the admission temperature and preferably solely by application of a vacuum.

---

This invention relates to a process for separating into its component gases a mixture composed of several gaseous constituents, more particularly, to the separation into its component gases by an adsorption technique of a complex gaseous mixture, containing more than two constituents, preferably at a temperature for which the isotherms of the constituents are substantially linear. By isotherm is meant the curve which represents, for a given temperature, the quantity of gas adsorbed per unit of mass of the adsorbent as a function of the pressure at equilibrium.

It is already known that when the isothermal curve of a gas is linear, desorption of the gas by lowering the pressure is facilitated. Desorption of gaseous mixtures of constituents can still be carried out at a temperature at which the isotherms are not linear.

It is further known that binary gaseous mixtures can be separated by adsorption by means of an adsorbent capable of adsorbing, at a given temperature, distinct and different quantities of the two component gases, at a speed sufficiently high in relation to the speed of diffusion of the mixture in the mass of the adsorbent, the adsorbent being capable of being degasified substantially at the same temperature simply by application of vacuum.

For example, U.S. Pat. No. 3,155,468 describes a separation process in which a certain quantity of a gaseous mixture is admitted under pressure at a certain temperature into a chamber containing an adsorbent which has been degasified under a vacuum, by way of a first zone, and then, just after completing the admission of the mixture, a gaseous fraction is withdrawn from the chamber through a second zone spaced from the first zone, thus lowering the pressure of the chamber to an intermediate value. Finally a residual gaseous fraction is removed from the chamber by evacuation and at a temperature close to the admission temperature. It is possible for all these operations then to be repeated periodically by repeated introduction of a fresh quantity of the mixture into the chamber, after extraction by vacuum of the residual gaseous fraction from the preceding period.

According to another embodiment of the process described in the above mentioned U.S. patent, the first gaseous fraction withdrawn from the chamber is introduced directly into a second chamber in the same manner as the gaseous mixture was introduced into the first chamber, so that the pressures of the two chambers are balanced. After completing the second admission, another gaseous fraction is withdrawn in the same manner as in the case of the first chamber, from the second chamber, and from the first chamber by way of the second chamber, thereby lowering the pressure of the two chambers to a second intermediate value.

It is also possible to separate a mixture of three or more gaseous constituents by means of the process described in the abovementioned U.S. patent. In the case, for example, of a mixture of three gaseous constituents, one can proceed as follows: one of the gaseous constituents is first separated from the other two in the manner described in the above-mentioned French patent. The binary mixture thus obtained is then compressed and separated into its constituents in the manner of the said U.S. patent.

This procedure of carrying out a number of successive separations, removing one component from the or each component in each step is long and tedious, especially in the case of mixtures of a large number of gaseous constituents. The various intermediate compression steps serve to extend the duration of the operation and in addition require intermediate compression plants which involve an increase in the cost of the installation.

It is an object of the present invention to overcome or, at least, mitigate, the aforesaid difficulties and to allow a mixture of several gases to be fractionated in a single separation stage, in a procedure wherein in addition to yielding up in a pure state the least adsorbable constituent, one or more of the other gaseous constituents of the mixture can be yielded in a pure or highly enriched state. It is a further object of the invention to enable the separation procedure to be speeded up by eliminating the need to carry out intermediate compression stages.

According to the present invention there is provided a method of separating a complex gaseous mixture of at least three gaseous constituents into at least three separate constituents, in which a given quantity of mixture under pressure, at given temperature, is admitted into several successive adsorption zones which have been evacuated, the admission of the mixture is stopped and one or optionally several gaseous fractions are withdrawn from the last of the said zones at one or more intermediate pressure levels, in which the said zones, the number of which is less by at least one integral value than the number of constituents to be separated, and which contain different adsorption masses capable of selectively adsorbing at least one of the constituents of the gaseous mixture, are then isolated from one another, whereupon the selectively adsorbed residual fractions are extracted in each of these zones at temperatures close to the admission temperature and preferably solely by application of a vacuum.

The gaseous mixture of a plurality of constituents can be admitted directly into several of the adsorption zones, which total at least one less than the total number of constituents in the mixture. Also, the downstream end of the last zone can be closed during the introduction stage.

In a particularly preferred mode of carrying out the method of the present invention, while keeping the downstream end of the last zone closed, the gaseous mixture is introduced into the various zones until they reach the pressure of the gas mixture being supplied to the zones, whereafter the downstream end of the last zone is opened and further quantities of the gaseous mixture are then introduced into the said zones. This manner of working is particularly applicable to those cases where the major constituent of the mixture is also the least adsorbable constituent.

In a further mode of carrying out the method of the present invention, the mixture of several gaseous constituents can be admitted into the first zone only, whereafter the source of the mixture is shut off and the downstream end of the first zone is brought into communication with a second zone so as to produce an expansion without withdrawal, the pressures in the two zones becoming balanced. One or more gaseous fractions are then withdrawn at the downstream end of the second zone, so as to reduce the pressure within the various zones to one or more intermediate levels. The different zones are finally isolated and a residual fraction is extracted from each zone, preferably solely by application of a vacuum.

When the number of adsorption zones is greater than two, then, during the introduction stage, the gaseous mixture can be allowed to pass from one zone to another, or from one group of zones to another zone or to another group of zones, after carrying out one or more expansions without withdrawal of gas.

Prior to the extraction of the residual fractions from each zone, preferably solely by application of a vacuum, several fractions can be successively withdrawn from the last zone. Also, successive zones can be combined so as to form a single zone, from which several fractions are withdrawn during successive expansions. It is not essential for the residual fractions extracted from each zone to differ. They can be identical. The gaseous fractions which are withdrawn or extracted can also be composed of pure constituents and at least one or more other constituents of the mixture in a highly enriched state.

All the operations can be repeated periodically by the introduction at each period of a new quantity of the mixture into the successive zones, provided that the residual fractions from the preceding operation have been extracted.

The successive zones can contain the same adsorbent or different adsorbents. Suitable adsorbents include active carbon and zeolites.

When carrying out the method of the present invention, prior to the entry of the gaseous mixture into the aforesaid zones, the zones are filled with a quantity of the least adsorbed gas. The presence of this gas prevents too rapid a progression of the gases entering the system of adsorption zones and improves the separation achieved. This gas is preferably introduced into the system at the downstream end from the point of admission of the mixture to be separated. The temperature in the zones can be maintained at the appropriate value by means of a thermostat or any other suitable device.

For a better understanding of the invention and to show how the same can be carried into effect reference will now be made by way of example only to the single figure of the accompanying drawing, which shows, schematically, a flow diagram of the present invention.

Referring to the drawing, the arrangement illustrated comprises two columns or chambers 3 and 5 each of which serves as an adsorption zone. The chamber 3 communicates at one end with an admission pipe 1 through an admission valve 2, and, at the other end, communicates through a valve 4 with the chamber 5. The chamber 5 is provided with a three-way withdrawal valve 6, which connects the chamber to gas storage vessels 7 and 7'.

The chambers 3 and 5 are also provided with extraction ducts 8 and 8' in which extraction valves 9 and 9' are located, which ducts connect the chambers 3 and 5 to gas storage vessels 11 and 11' through vacuum pumps 10 and 10'.

Clearly, the arrangement is not limited to the embodiment as illustrated. It is capable of numerous modification known to the person skilled in the art which still render it suitable for use in the method of the invention. For example, it can comprise more adsorption chambers, i.e. three or more adsorption chambers, gas storage vessels or pumping systems. Other modifications to the system illustrated which can be effected include that of effecting the extraction simultaneously at several levels within the adsorption chambers.

The following examples illustrate the invention:

EXAMPLE 1

The chamber 3 of the apparatus shown in the accompanying drawing having a volume of 1 litre, was filled with 516 g. of active carbon "$AC_4$," marketed by Barnebey and Cheney. The chamber 5 having a volume of two litres and the same cross-sectional parameters as the chambers 3, was filled with 1032 g. of the active carbon referred to above.

The whole apparatus shown in the accompanying drawing was evacuated under a vacuum of 0.5 to 1 mm. Hg and was then filled with hydrogen at atmospheric pressure. The quantity of hydrogen contained therein was 3.75 litres.

The valves 2 and 4 were held open and the valves 6, 9 and 9' were then closed. A mixture of 11% of $CO_2$, 25% of CO and 64% of $H_2$ was then introduced at ambient temperature through the admission pipe 1 at an effective pressure of 30 eff. bars, in order to produce pure hydrogen and recover the carbon monoxide.

Admission of the mixture was continued until the pressure in the apparatus reached approximately 30 eff. bars.

The valve 2 was then closed and withdrawal valve 6 was opened, in order to collect in the gas storage vessel 7 a gaseous fraction which consisted of 71.25 litres of hydrogen with less than 20 p.p.m. of CO. The extraction time was such that the pressure in the apparatus at the end of this first withdrawal was 4.3 bars.

When this first expansion was completed, a second withdrawal was effected through the withdrawal valve 6 in order to collect in the gas storage vessel 7' a gaseous fraction consisting of 8.7 litres of a mixture of hydrogen and 15% of carbon monoxide. The extraction time was such that the pressure in the apparatus at the end of this second withdrawal was 1 eff. bar.

The valves 4 and 6 were then closed and the valves 9 and 9' were opened. The residual gaseous components in the chambers 3 and 5 were then extracted through the vacuum pumps 10 and 10'. About 21.5 litres of a gaseous fraction containing 61% of $CO_2$ and 37% of CO were collected from the chamber 3 through the pipe 8 in the gas storage vessel 11. 21.5 litres of a gaseous fraction containing 95% of CO, 5% of hydrogen and no $CO_2$ were collected in the gas storage vessel 11'.

The total volume of the contents of the four gas storage vessels was 119.2 litres, after subtracting the 3.75 litre quantity of $H_2$ originally present. The yield of hydrogen produced, containing 20 p.p.m. of CO, was thus 88.6%; the carbon monoxide was produced with a purity of 95% in a yield of 68.5%.

EXAMPLE 2

Example 1 was repeated with the difference that the admission pressure employed was 25 eff. bars instead of 30 eff. bars. The pressure in the apparatus, following the first expansion, was 1.2 eff. bars (instead of 4.3) and the pressure following the second expansion was 0.5 eff. bar.

At the end of the first expansion, 67.25 litres of a gaseous fraction containing less than 20 p.p.m. of CO were collected in the gas storage vessel 7. At the end of the second expansion, 2.05 litres of a mixture of hydrogen and 44% of CO was collected in the gas storage vessel 7'.

After closing the valves 4 and 6 and opening the valves 9 and 9', 18.00 litres of a gaseous fraction containing 62.5% of $CO_2$ and 36.5% of CO were collected in the gas storage vessel 11. 18.55 litres of CO containing 2.7% of $H_2$ and no $CO_2$ were collected in the gas storage vessel 11'.

The total volume of the contents of the four storage vessels was 102.10 litres (after subtracting the original quantity of hydrogen). The yield of hydrogen produced containing 20 p.p.m. of CO was thus 97%; the carbon monoxide was produced with a purity of 97.3% in a yield of 70.5%.

EXAMPLE 3

Example 1 was again repeated, but the admission pressure was reduced to 15 eff. bars and the admission of the gaseous mixture was continued with the valves 6, 9 and 9' closed and 2 and 4 open, until the pressure in the arrangement illustrated reached 15 bars; the withdrawal valve 6 was then opened, without stopping the admission, so as to effect a first isobaric withdrawal.

43.65 litres of hydrogen were produced in the isobaric withdrawal and were collected in the gas storage vessel 7.

The valve 2 was then closed and a first expansion was effected, giving a pressure of 2.3 bars in the apparatus. This was followed by a second expansion to give a pressure of 0.73 eff. bar in the apparatus.

The gaseous fraction obtained during the first expansion was collected in the gas storage vessel 7 and mixed with the 43.65 litres of hydrogen already present. The gas storage vessel 7 then contained 76.00 litres of hydrogen containing less than 20 p.p.m. of CO.

Thus, at the ambient pressure and at 20° C., the order of decreasing adsorption is:

active carbon: $CO_2$, $CH_4$, $CO$, $N_2$, $H_2$
silica gel: $CO_3$, $CH_4$, $CO$, $N_2$, $N_2$
zeolites: $CO_2$, $CO$, $CH_4$, $N_2$, $N_2$ The separation factor of hydrogen and nitrogen which immediately precedes it is generally high, and this suggests that these components can be separated effectively from one another. It will be possible to obtain hydrogen in the withdrawn phase in as pure a form as desired, as a function of the degasification of the adsorbent.

It will be possible to separate nitrogen from the constituents which precede it in the above classifications by withdrawal, by prolonging the expansion after the production of pure hydrogen. This second expansion yields a fraction enriched in nitrogen. The $CO_2$ is the most readily adsorbed component, whatever the nature of the adsorbent.

The degree of purity of the fractions which are obtained will depend on the choice of the adsorbents.

The following tables give, by way of example, the calculated values of the separation factors, at the ambient pressure and at 20° C., of various constituents of the mixture for different types of adsorbent.

TABLE I

| | $CO_2/CH_4$ | $CH_4/CO$ | $CH_4/N_2$ | $CO/N_2$ | $CO/H_2$ | $N_2/H_2$ | $CH_4/H_2$ |
|---|---|---|---|---|---|---|---|
| Silica gel (dead volume 0.85 cc./g.) | 6.4 | 1.31 | 1.86 | 1.42 | 2.9 | 2.05 | 3.8 |
| Active carbon (dead volume 1.45 cc./g.) | 2.09 | 2.07 | 2.84 | 1.37 | 6.97 | 5.1 | 14.4 |

TABLE II

| | $CO_2/CO$ | $CO/CH_4$ | $CH_4/N_2$ | $N_2/H_2$ | $CO/N_2$ | $CH_4/H_2$ | $CO/H$ |
|---|---|---|---|---|---|---|---|
| Zeolite 5A (dead volume 1.11 cc./g.) [1] | 3.15 | 1.79 | 1.4 | 6.9 | 2.5 | 9.65 | 17.2 |
| Zeolite 13X (dead volume 1.33 cc./g.) [2] | 4.7 | 1.58 | 1.52 | 5.25 | 2.4 | 8 | 12.6 |
| Sodium mordenite (dead volume 0.85 cc./g.) | 2.23 | 1.18 | 1.39 | 11.2 | 1.65 | 15.55 | 18.5 |

[1] Marketed by Union Carbide Corporation.
[2] Marketed by Linde.

The gaseous fraction obtained in the second expansion was conducted to the gas storage vessel 7' in which 6.70 litres of a mixture of hydrogen and 39% of CO were collected.

The valves 4 and 6 were then closed and the valves 9 and 9' were opened. 20.20 litres of a gaseous fraction containing 65% of $CO_2$, 34% of CO and 1% of $H_2$ were collected in the gas storage vessel 11 and 20.9 l. of a gaseous fraction containing 98% of CO and 2% of $H_2$ were collected in the gas storage vessel 11'.

The total volume of the contents of the four gas storage vessels was 120.05 litres, after subtraction of the initial quantity of hydrogen. The extraction yield of hydrogen, containing 20 p.p.m. of CO, was thus 93.8%; the carbon monoxide was produced in a purity of 98% and in extraction yield of 68%.

EXAMPLE 4

A gaseous mixture having the following composition:

| | Percent |
|---|---|
| $H_2$ | 63 |
| CO | 20.7 |
| $CO_2$ | 12 |
| $N_2$ | 3.5 |
| $CH_4$ | 0.8 | was processed in the arrangement illustrated in the accompanying drawing to produce pure hydrogen and to recover the CO in as pure a form as possible.

Examination of the isotherms of these gases on various adsorbents shows that the classification by order of decreasing adsorption is not the same for all adsorbents.

It can thus be seen that the largest separation factor between the $CH_4$, and the CO occurs with active carbon. It will thus be possible to obtain the $CH_4$ in enriched form if the first chamber is filled with active carbon, which will contain, by suitably dimensioning it, first of all a fraction rich in $CO_2$ and then a fraction rich in $CH_4$. The mixture leaving this first chamber, and passing to the second, theoretically contains only CO, $N_2$ and $H_2$.

The hydrogen and the nitrogen are extracted successively by two expansions; the CO is adsorbed and thus concentrated in the second chamber. This second chamber can be filled either with carbon or with a zeolite. The separation factors of the CO, $N_2$ and $H_2$ mixture are better with zeolites than those when active carbon is used. However, although the isotherms of CO depart from linearity at the temperature in question, on zeolites, but not on active carbon, the ease of removal of the CO from the active carbon is equalled in the case of zeolites, although a higher expenditure of energy for evacuation is required.

The same conditions as used in Example 3 were employed; the two chambers 3 and 5 being filled respectively with 516 g. and 1032 g. of active carbon $AC_4$, marketed by Barnebey and Cheney.

Withdrawal of $H_2$ was effected while continuing to admit the mixture to be treated (isobaric operation) and then carrying out the two successive expansions.

47.40 litres of hydrogen were collected by the isobaric withdrawal at 15 effective bars in the gas storage vessel 7. After the first expansion in which the pressure dropped from 15 effective bars to 4.4 bars, the gas storage vessel 7 contained 73.40 litres of hydrogen containing less than 0.1% of impurities.

After the second expansion in which the pressure dropped from 4.4 bars to 1 effective bar, a gaseous fraction containing 13.25 litres of a mixture of hydrogen and 14.2% of nitrogen and 18.7% of CO was collected in the gas storage vessel 7'.

After closing the valves 4 and 6 and opening valves 9 and 9', 22.07 litres of a gaseous fraction containing 68.8% of $CO_2$, 21.9% of CO and 4.35% of $CH_4$ was collected by evacuation in the gas storage vessel 11, and 22.03 litres of a gaseous fraction containing 86.3% of CO, 9.4% of $N_2$, 3.7% of $H_2$ and 0.59% of $CH_4$ was collected by evacuation in the gas storage vessel 11'.

The total volume of the contents of the four gas storage vessels after subtraction of the initial quantity of hydrogen was 127 litres; 100% of the $CO_2$ and 88% of the methane were extracted in the chamber 3. The yield of carbon monoxide having a purity of 86.3% obtained in the second chamber was 72.2%. 42.3% of all the nitrogen was extracted in the second expansion. Finally, the hydrogen was produced with a content smaller than 0.1% of impurities in a yield of 87.6%.

EXAMPLE 5

The gaseous mixture used in Example 4 and containing $CH_4$, $CO_2$, CO, $N_2$ and $H_2$ was treated in the arrangement illustrated in the accompanying drawing. The chamber 3 was filled with 516 g. of "$AC_4$ carbon" marketed by Barnebey and Cheney and the chamber 5 was filled with 1116 g. of zeolite 13X, in granules of 1.6 mm. diameter.

The entire apparatus was first evacuated and was then filled with 3.3 litres of hydrogen at atmospheric pressure. The isobaric withdrawal conditions of Example 3 were used, but at a pressure of 25 effective bars.

41.6 litres of hydrogen were collected by isobaric withdrawal in the gas storage vessel 7. After the first expansion, in which the pressure dropped from 25 to 4 effective bars, the gas storage vessel 7 contained 89.62 litres of hydrogen containing less than 0.7% of impurities. After the second expansion, from 4 bars to 0.22 bar, the gas storage vessel 7' contained 14.68 litres with 48.2% of hydrogen 29.1% of nitrogen, 22.5% of CO and 0.19% of methane.

After closing the valves 4 and 6, opening the valves 9 and 9', and evacuating the chambers 3 and 5, a gaseous fraction having a volume of 21.80 litres, and containing 82% of $CO_2$, 12.4% of CO, 4.1% of $CH_4$, 1% of $N_2$ and 0.5% of $H_2$, was collected in the gas storage vessel 11, and a gaseous fraction having a volume of 26 litres, and containing 95.25% of CO, 2.9% of $N_2$, 1% of $CH_4$ and 0.75% of $H_2$, was collected in the gas storage vessel 11'.

The total volume of the contents of the four gas storage vessels, after subtraction of the initial quantity of hydrogen, was 148.8 litres.

The fraction adsorbed in chamber 3 were rich in $CO_2$ and $CH_4$, containing 100% of all the $CO_2$ initially present and 74% of all the methane initially present. The gas adsorbed in the chamber 5 contained CO in a purity of 95.25%. The yield of CO extracted was thus 80.5%. In the second expansion, the fraction obtained was rich in $N_2$, containing 82% of the nitrogen initially present. Finally, the hydrogen was produced in a purity of more than 99.9% in an extraction yield of 80.5%.

The CO/$N_2$ and $N_2$/$H_2$ separation factors, which are greater in the case of zeolites than with carbon, thus enabled a more efficient separation of CO, $N_2$ and $H_2$ to be obtained than in Example 4.

It will readily be possible for the person skilled in the art to modify the procedures described above without departing from the scope of the invention. For example, for $n$ constituents, it would be possible to separate these constituents by means of ($n-1$) adsorption zones, each of these zones preferentially adsorbing one of the constituents of the gaseous mixture.

What we claim is:

1. A method of separating by adsorption a gaseous mixture of at least three components into at least three of these components, comprising introducing the gaseous mixture at a certain pressure by a serial admission into a plurality of successive adsorption zones of a number less than the number of said components, withdrawing a gaseous fraction from the last of the said zones at the said pressure, interrupting the admission of the said mixture, withdrawing a gaseous fraction from the last of the said zones until a pressure lower than said certain pressure is obtained, isolating said zones from each other, and withdrawing a gaseous fraction from each of said isolated zones under the action of vacuum.

2. A method as claimed in claim 1, and maintaining closed the end of said one zone which is opposite the point of admission during the admission stage.

3. A method as claimed in claim 2, in which the admission of the mixture into said one zone is stopped, then said closed end of said one zone is opened to establish communication between said one zone and said another zone and to permit the pressure in said one zone to drop.

4. A method as claimed in claim 1, and maintaining closed the end of said last zone which is opposite the point of admission during the admission stage.

5. A method as claimed in claim 1, and separately successively withdrawing from said last zone a plurality of gaseous fractions.

6. A method as claimed in claim 1, in which the plurality of successive adsorption zones forms a single zone, and separately successively withdrawing from said single zone a plurality of gaseous fractions.

7. A method as claimed in claim 1 which is repeated in a plurality of repeating cycles.

8. A method as claimed in claim 1, in which said zones contain the same adsorbent but in different quantities.

9. A method as claimed in claim 1, and filling said zones with the least adsorbable component of the gaseous mixture prior to introduction thereinto of said gaseous mixture.

10. A method as claimed in claim 1, in which said zones contain different adsorbents.

References Cited

UNITED STATES PATENTS

| | | | |
|---|---|---|---|
| 3,141,748 | 7/1964 | Hoke et al. | 55—25 |
| 3,155,468 | 11/1964 | DeMontgareuil et al. | 55—25 |
| 3,252,268 | 5/1966 | Stark | 55—25 |

FOREIGN PATENTS

| | | |
|---|---|---|
| 365,092 | 1/1932 | Great Britain. |

REUBEN FRIEDMAN, Primary Examiner

C. N. HART, Assistant Examiner

U.S. Cl. X.R.

55—58